(12) United States Patent
Petrov

(10) Patent No.: US 10,131,487 B2
(45) Date of Patent: Nov. 20, 2018

(54) FLUID MIXING AND DISPENSING CONTAINER

(71) Applicant: Inventure Labs LLC, Jersey City, NJ (US)

(72) Inventor: Stan C. Petrov, Costa Mesa, CA (US)

(73) Assignee: INVENTURE LABS LLC, Jersey City, NJ (US)

( * ) Notice: Subject to any disclaimer, the term of this patent is extended or adjusted under 35 U.S.C. 154(b) by 0 days.

(21) Appl. No.: 15/426,806

(22) Filed: Feb. 7, 2017

(65) Prior Publication Data
US 2017/0144824 A1    May 25, 2017

Related U.S. Application Data

(63) Continuation-in-part of application No. 14/098,192, filed on Dec. 5, 2013, now Pat. No. 9,701,460.

(51) Int. Cl.
| | |
|---|---|
| *B65D 83/66* | (2006.01) |
| *B65D 83/68* | (2006.01) |
| *B65D 83/52* | (2006.01) |
| *B05B 9/08* | (2006.01) |
| *B01F 13/00* | (2006.01) |
| *B01F 13/10* | (2006.01) |
| *B01F 15/02* | (2006.01) |

(52) U.S. Cl.
CPC ......... *B65D 83/682* (2013.01); *B01F 13/002* (2013.01); *B01F 13/1061* (2013.01); *B01F 15/0238* (2013.01); *B05B 9/0833* (2013.01); *B65D 83/525* (2013.01); *B65D 83/66* (2013.01); *B01F 2215/0031* (2013.01); *B01F 2215/0032* (2013.01)

(58) Field of Classification Search
CPC ................ B01F 13/002; B01F 13/1061; B01F 15/0238; B01F 2215/0031; B01F 2215/0032; B05B 9/0833; B05C 17/00503; B05C 17/00556; B65D 83/525; B65D 83/663; B65D 83/685; B65D 83/682; B65D 83/66
See application file for complete search history.

(56) References Cited

U.S. PATENT DOCUMENTS

| | | | |
|---|---|---|---|
| 2,973,885 A | 3/1961 | Ferguson |
| 2,976,897 A | 3/1961 | Beckworth |
| 3,511,418 A | 5/1970 | Venus |
| 3,558,010 A | 1/1971 | Zenger |

(Continued)

FOREIGN PATENT DOCUMENTS

| | | |
|---|---|---|
| EP | 1 350 739 | 10/2003 |
| WO | WO 02/22467 | 3/2002 |

*Primary Examiner* — Nicholas J Weiss

(57) ABSTRACT

A handheld reusable multi-compartmental mixing and dispensing container for storing fluids separately therein before mixing. The proportions of the substances in a mixture are externally adjustable. The desired concentration is determined by test components attached to the container that sense various environmental and user specific factors. The amount of the adjustable substance to be added to a mixture is controlled by an adjustment wheel on the container. A single control button allows a user to choose what fluid substances are to be mixed and dispensed. A pressurized gas propellant in a replaceable canister moves the fluid around and out of the container.

17 Claims, 21 Drawing Sheets

(56) References Cited

U.S. PATENT DOCUMENTS

| | | |
|---|---|---|
| 4,335,837 A | 6/1982 | Bono |
| 4,818,491 A | 4/1989 | Fariss |
| 4,838,457 A | 6/1989 | Swahl |
| 4,893,729 A | 1/1990 | Iggulden et al. |
| 4,993,594 A | 2/1991 | Becker |
| 5,589,398 A | 12/1996 | Krause et al. |
| 5,612,542 A | 3/1997 | Brown |
| 5,638,992 A | 6/1997 | Lim et al. |
| 5,647,513 A | 7/1997 | Favre |
| 5,848,732 A | 12/1998 | Brugger |
| 6,394,364 B1 | 5/2002 | Abplanalp |
| 6,405,867 B1 | 6/2002 | Moore |
| 7,509,839 B2 | 3/2009 | Duranton |
| 8,118,193 B2 | 2/2012 | Law |
| 8,224,481 B2 | 7/2012 | Bylsma |
| 8,596,498 B2 | 12/2013 | Werner |
| 8,800,818 B2 | 8/2014 | Greenberg |
| 8,857,738 B2 | 10/2014 | Knopow |
| 8,978,936 B2 * | 3/2015 | Eini ..................... B65D 83/68 222/1 |
| 2008/0259315 A1 | 10/2008 | Mersch |
| 2009/0152300 A1 | 6/2009 | Hayman et al. |

\* cited by examiner

FLUID MIXING AND DISPENSING CONTAINER

CROSS-REFERENCE TO RELATED APPLICATION

This application is a continuation-in-part of application U.S. Ser. No. 14/098,192, filed Dec. 5, 2013 for a Fluid Mixing And Dispensing Container.

BACKGROUND OF THE INVENTION

1. Field of the Invention

The present invention relates to a hand-held reusable multi-compartmental mixing and dispensing container that permits a user to customize a mixture of fluids to be continuously dispensed.

2. Description of Related Art

As science and medicine have added to our knowledge base, our understanding of the human body and effects of various environmental factors on it has advanced. We are adept at manufacturing and using various substances to enhance our appearance, protect us from the environment, improve our health, for example. The market is flooded with cosmetics and pharmaceutics.

Currently most of these compounds come premixed, or, at most, in containers that allow one time mixing and dispensing in preset proportions. But, the human body and the environment are both dynamic. As a result, the cosmetic or pharmaceutical mixture being dispensed is rarely, if ever, specifically tailored to the individual and their environment.

For example, sunscreens are produced with a specific preset amount of UV protective factors (SPF), emollients, and fragrances. As a consumer uses the product, the contents of the sunscreen being dispensed cannot be adjusted to take into account the changes in their skin color, the time of day, the weather, their individual preferences, or even whether it is more convenient to use a spray or a cream. Similarly, hair dyes are provided in a limited number of colors. A user is left to figure out what shade would work best with their hair color and type. It is not possible to do a match with any degree of accuracy. The containers used are not amenable to midstream changes in the relative proportions of the ingredients. The containers are not capable of dispensing a test sample. Dispensing of medicinal creams and lotions also presents a problem. Although dermatologists, and other physicians who treat skin conditions, most commonly prescribe the use of steroids, anti-fungal agents, antibiotic creams and emollients, there are no containers available that allow a patient to mix the cream and lotion at will, and dispense the mixture as a unit.

As a result, a user does not experience the full benefits of a product simply because the mixture has not been tailored to meet their individual needs. They end up buying and using multiple products, which will be less effective. This has a negative impact on both the consumer and the environment. Plastic containers are a large contributor to landfill waste. Moreover, disposal of containers with product may be toxic.

With regard to medicinal applications there is a significant risk that patients who must juggle multiple medications or creams will neglect one or more of the necessary components of their treatment plan. About 50-75% of patients are noncompliant with regard to their prescriptions. Only 20% of diabetics adhere to their insulin administration regime faithfully. This is very expensive in tell is of human health and the economy. In fact, it has been estimated that non-compliance with healthcare regimes "accounts for up to $100 billion in healthcare and productivity costs".

A dispensing and mixing container that takes into account the uniqueness of the each user, as well as the real-time environmental factors, providing personalized cosmetics, dermatologic creams, or administration of medications is needed. The current state of the art does not provide such a device.

With regard to dispensing containers, there are various types available:

U.S. Pat. No. 4,893,729 by Iggulden, Streck describes a bottle designed to dispense various mixtures of lotion and UV protective agents. The dispenser uses bores, does not have a self-retractable tip, is not powered by a pressurized gas canister, and does not give the user guidance as to the right amount of sunscreen agent or other compound that should be added. It cannot be personalized.

EP1350739, US2009/0152300, U.S. Pat. No. 5,638,992, and WO2002/022467 all describe containers that mix two fluids. In EP1350739, separation is maintained by a breakable seal. In US2009/0152300, it is not. In U.S. Pat. No. 5,638,992, the inner pressurized container bursts causing mixing. In WO2002/022467, the compounds remain separate until dispensed and are not mixed. In none of these examples, is the user able to select the proportions of the compounds that will form a part of a final mixture. Mixing is done on a one-time basis. The amounts dispensed are not user-determined by test amounts. These prior art examples do not allow the product to be personalized.

With regard to UV detection and measuring, various products have been devised.

U.S. Pat. No. 5,589,398 by Krause et al. describes UV test strips that use a photoactive chromogenic substance to detect sunburn-causing UV radiation. These test strips do not take into account a user's skin color, are for one-time use only, are not paired with a sunscreen mixer and dispenser, and do not allow the user to choose between spray or cream. Furthermore, exposure to light causes the UV Fastcheck strips to lose their function.

US2008/0259315 by Mersch utilizes titanium dioxide and resazurin to create an irreversible change upon UV exposure. This will allow a user to determine when they have been exposed to excess UV radiation. It will not advise a user, in advance, about the sunscreen protection necessary. It will not tell a user whether a sunscreen is effective.

A UV sun strength warning band operates via photochromic dyes. The band does not take a user's skin color into account.

Therefore, although there are various mixing bottles and test strips on the market, none of these products allow continuous precise repeated mixing and dispensing of varying proportions and amounts of the contained substances. None allow the substance to be altered by the user each time a mixture is dispensed, informed by measurements resulting from the use of test components that sense the environment and the user, and are affixed to the surface of the container as described hereafter.

SUMMARY OF THE INVENTION

A multi-compartment container capable of mixing adjustable proportions of one substance with one or more other substances, and selectively dispensing varying amounts of the mixture via a user-selected system is provided. The desired proportions of substances within a mixture are determined according to input received from test components or other interfaces that sense various environmental and user-specific factors.

The container holds various substances in separate compartments without allowing them to mix, preventing chemical interaction and extending shelf life. The compartments are refillable, making it possible to give the user a range of choices for what they would like to mix. For example, in the case of sunscreen, the user could have a choice between the type of UV filtering agent, the fragrance, the emollient content, and whether the mixture is dispensed as spray or cream. In the case of a dermatologic treatment agent, the user could choose the amount of emollient needed and, based on input from a treating physician, whether it is mixed with a steroid or, for example, an anti-fungal. In the case of medication for diabetes, a patient could be administered an individually tailored mixture of fast and slow-acting insulin mixed with diluent or another substance, based on factors such as their blood sugar and the time of day.

A user can choose the proportion of each substance that will be mixed. This choice is guided by a system of environmentally and user-sensitive test components. For example in the preferred embodiment of the invention a built in UV graded test strip gives the user the ability to detect UV light and quantifies this information into a number, this number can be correlated with a strip that takes into account the individuals skin color and thus their natural defense against UV rays, adjusting the number provided by the UV graded test strip. From this the user can easily determine the adequate UV protection for their particular skin type and adjust the device accordingly via the adjustment wheel. A separate multifunction pushbutton further controls the amount and flow of the final substance to be extruded.

Expulsion of the final mixture is accomplished by retractable nozzles. The push button, based on direction of operation, allows a user to select cream or spray, for example. Nozzles are designed to prevent spillage, or the buildup of debris. In order to be cost effective, the invention utilizes a replaceable gas cartridge with pressurized propellant to allow propulsion and proper function. A pressurized gas system with replaceable cartridge moves the mixture. Because there are no electronic components or batteries, the container of the present invention is both lightweight and environmentally friendly.

BRIEF DESCRIPTION OF THE DRAWINGS

Many of the attendant advantages of this invention will be readily appreciated as the same becomes better understood by reference to the following detailed description considered in conjunction with the accompanying drawings in which like reference numerals designate like parts throughout the figures thereof and wherein:

FIG. 15A shows the push button 37 in neutral position that results in no propellant flowing;

FIG. 15B shows the bottom part of the push button 37 depressed;

FIG. 15C shows the top part of the push button 37 depressed;

FIG. 15D shows the self-retracting pressure nozzles 38 opening to rising pressure as pressurized substance is delivered via the mixing pipe;

FIG. 16A is a partial cross section that shows the adjuster valve assembly;

FIG. 16B shows the movement of propellant into an internal compartment when the adjuster valve is in a slightly open position;

DETAILED DESCRIPTION OF THE PREFERRED EMBODIMENTS

Figure 1:
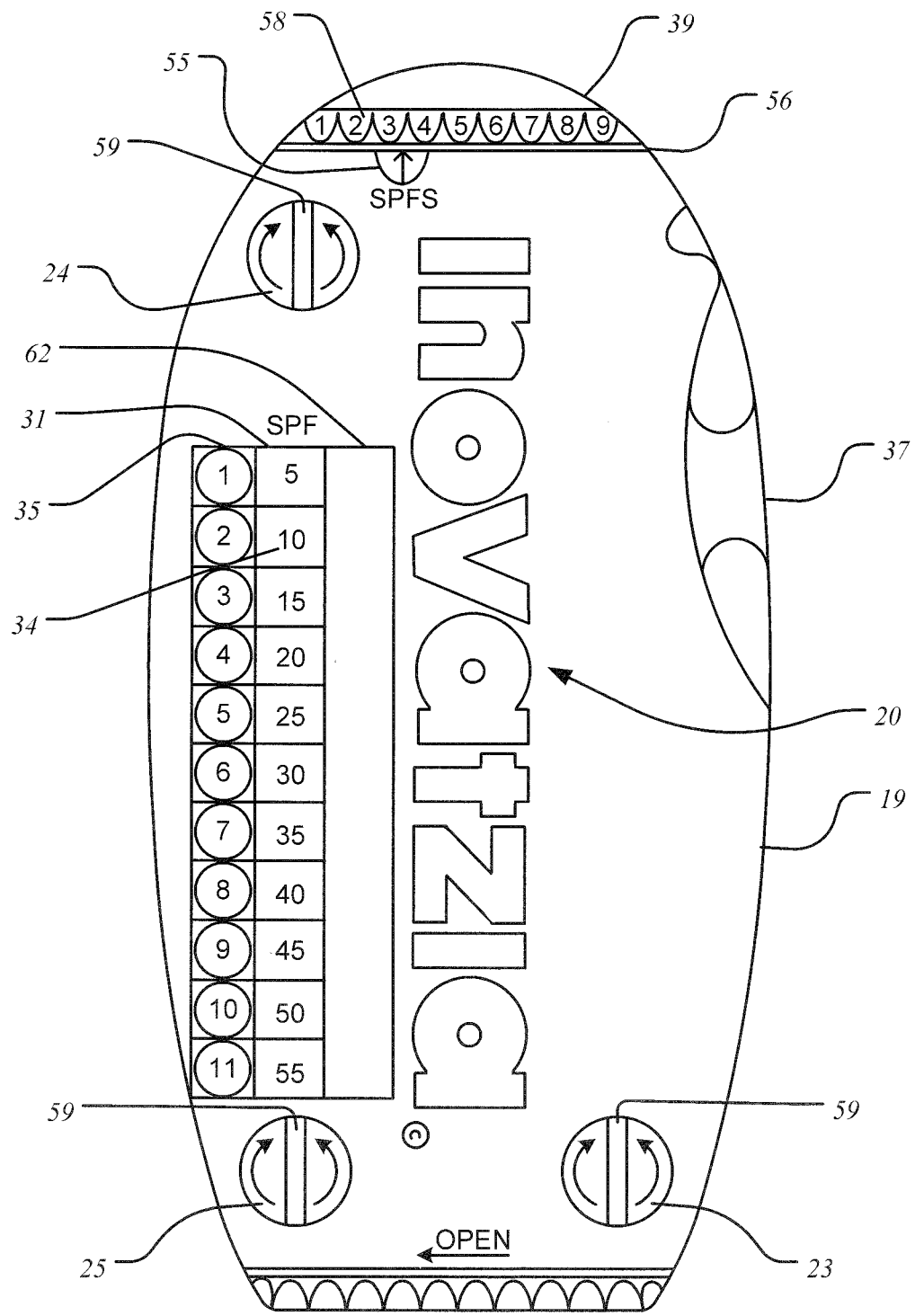
FIG. 1 is a front view of the outside portion of a preferred embodiment of the container 19 according to the invention, showing a temperature and moisture sensitive logo 20 and environmentally and user sensitive test components.
Figure 3:
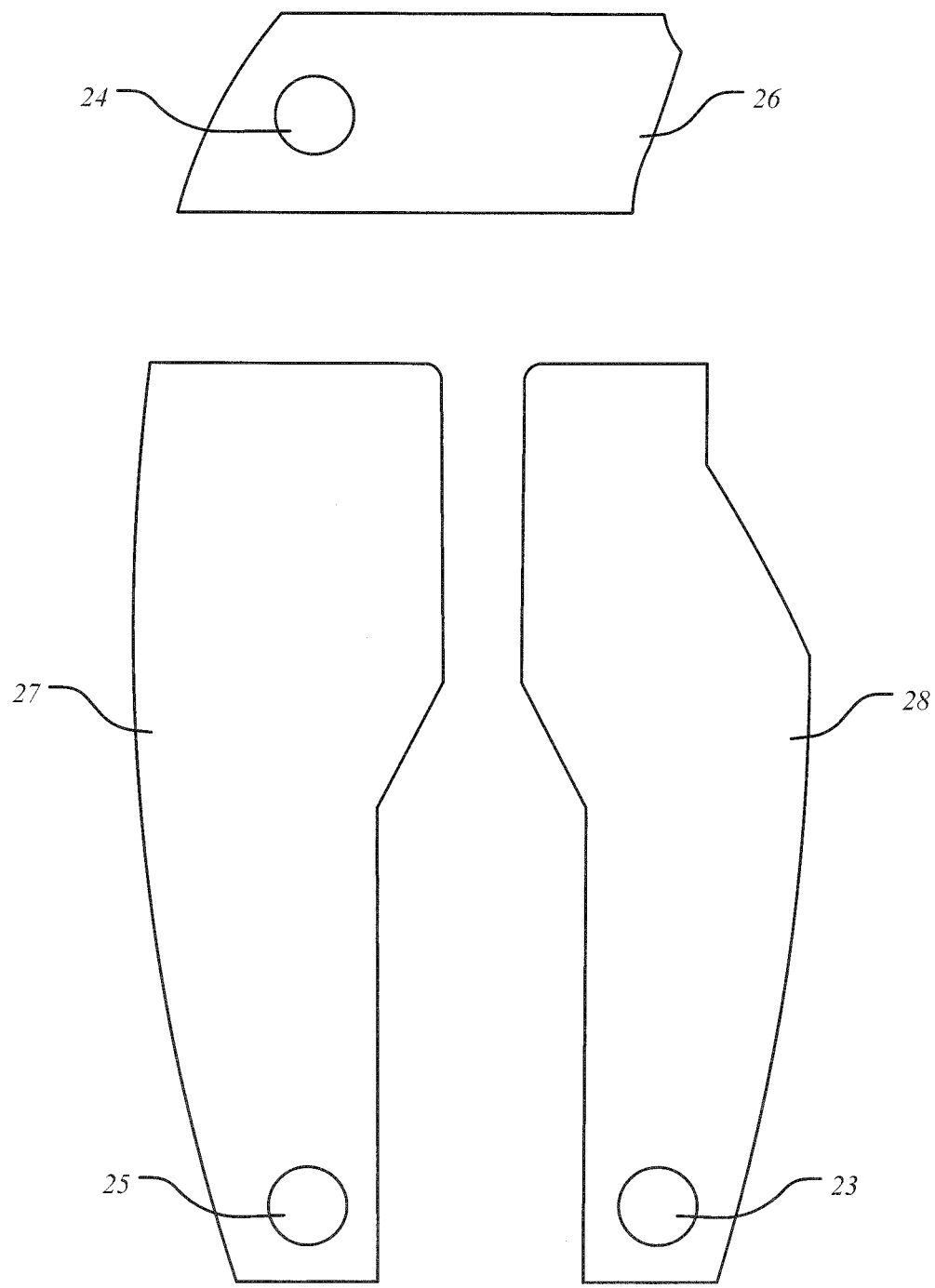
FIG. 3 is an illustration of the separate individual internal compartments 26, 27, 28 within the container 19, showing threaded openings 24, 25, 23 respectively for the slotted fill caps matched for each compartment 26, 27, 28.
Figure 4:
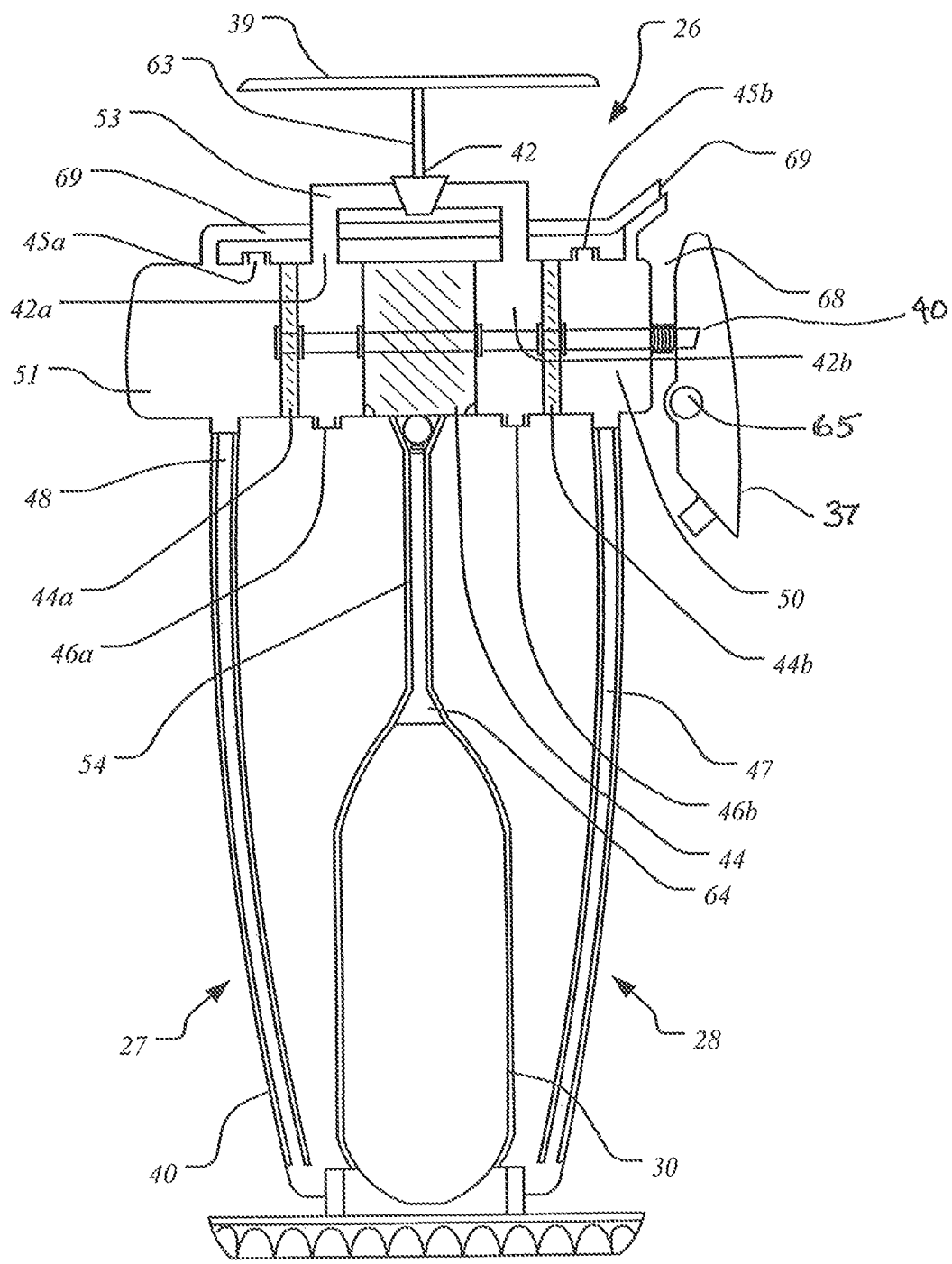
FIG. 4 is a partial cross-section of the container 19 showing the major internal components that regulate the flow of propellant and substances.
Figure 5:
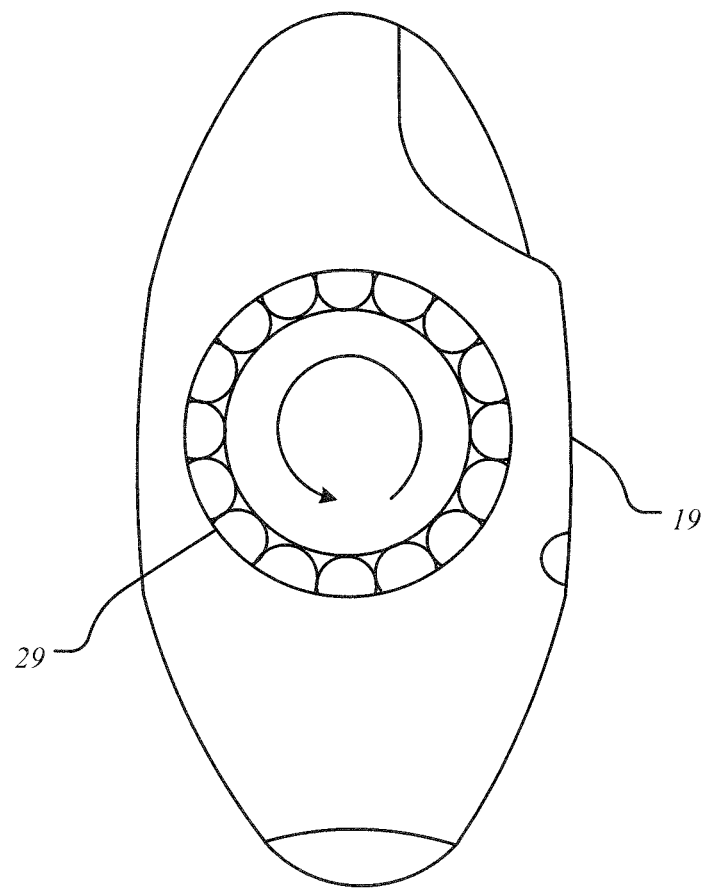
FIG. 5 is a bottom view of the container 19 with a threaded wheel 29 in the base that enables access to and replacement of a pressure cartridge.

A preferred embodiment of the container 19 of the invention, that can be used to dispense sunscreen lotion or spray, is shown in FIG. 1. A clicking adjuster wheel 39 (FIG. 13) on top of the container 19 allows a user to select the proportion of substance, such as UV light protectant for example, that is mixed in from an internal compartment 26 (FIG. 3), with one of the other two substances stored in the two other internal compartments 27, 28 (FIG. 3). The clicking adjuster wheel 39 allows precise control of the amount of substance added to a mixture, as will be explained hereafter. In the case of UV light protectant, a Sun Protective Factor adjuster arrow 55 points to an adjuster wheel symbol 58 that correlates with the Sun Protective Factor (SPF) being dispensed. The Sun Protective Factor adjuster arrow 55 also correlates with the number of clicks that the user perceives from a neutral position. An upper frictionless ring 56 separates the clicking adjuster wheel 39 from the container 19 allowing for smooth function during use.

Container 19 holds the major internal components such as internal compartments 26, 27, 28 (FIG. 3) and has openings for fill caps 24, 25 and 23 for those compartments. The container 19 is preferably made of duraluminum/zirconium for example, but other moldable equally durable materials, such as polymers may be used. Three threaded openings 24, 25 and 23 (FIG. 3) pass through the front of the container 19 into their respective internal containers 26, 27, 28 (FIG. 3) and are closed by slotted fill caps 59. Each slotted fill cap 59 features a coin-width slot in its surface for easy opening. Substances are added to the internal compartments 26, 27, 28 after removing the slotted fill caps 59 from the threaded openings 23, 24, 25. The contents, composition and nature of the various compartments can be adjusted, according to user and manufacturer preferences. In a preferred embodiment, the internal compartments 26, 27, 28 are filled with the following substances: compartment one 26 (FIG. 3) contains a UV light protectant. Compartment three 28 (FIG. 3) is filled with a cream based emollient. Compartment two 27 is filled with a fluid for spraying.

Figure 6:
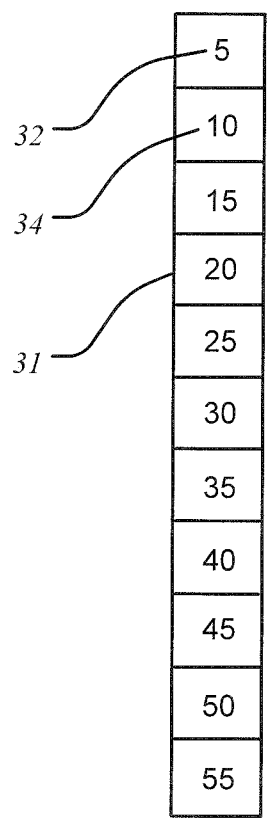
FIG. 6 illustrates a graded multilayered UV light sensitive strip 31 with its light sensitive symbols 34 surrounded by non-light reactive reflecting paint 32.

Referring to FIG. 1, environmentally sensitive components are built into the container 19. In a preferred embodiment, this includes a centrally located temperature and moisture-sensitive logo 20 that alerts the user when the container 19 has been exposed to environmental changes that could prevent optimal function. Test components in this device are located to one side of the temperature and moisture sensitive logo 20. These can be adjusted to a manufacturer's or user's specifications. In the case of a container 19 for UV product, a graded multilayered UV light sensitive strip 31 is located along side of the temperature and moisture sensitive logo 20. This graded multilayered UV light sensitive strip 31 is shown in more detail in FIG. 6 and FIG. 7.

Figure 7:
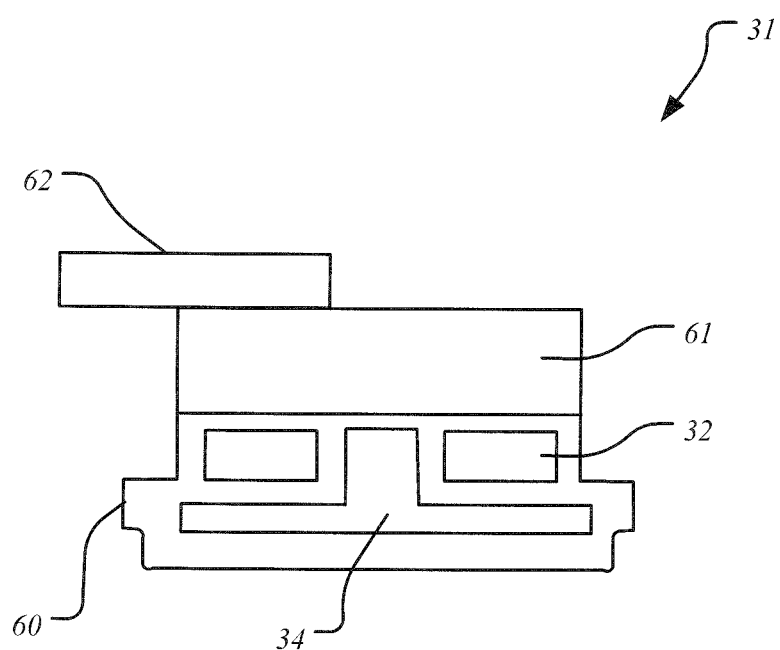
FIG. 7 is a cross section of the graded multi layered UV light sensitive strip 31 of FIG. 6, showing its multilayer structure.

Referring to FIG. 7, the base layer 60 of the graded multilayered UV light sensitive strip 31 is a non-thermoconductive light-reflective layer that besides providing some thermal insulation for the contents of container 19, is combined with adhesive on the underside, that allows the UV light sensitive strip 31 to be securely fastened to the surface of the container. The next layer 32, is a non-light-reactive reflective paint. The operational part of the strip is partially contained in this layer, which contains light sensitive symbol 34 made of light reactive reflecting paint. The next layer 61 is a graded UV light variable filter as found in UV shielded glass windows, films, and other applications. Although FIG. 7 only shows one grade of the graded UV light variable filter 61, an actual graded UV light variable filter has consecutive grades adjacent to each other forming a strip. When exposed to light, as the light intensity increases and more UV can propagate through a particular grade of the graded UV light variable filter 61, the light reactive reflecting paint of the symbol 34 under that filter will react by contrasting with the non-light reactive reflecting paint 32, creating a visible light sensitive symbol 34. In summary, when the amount of UV light goes beyond the filter capabilities of the graded UV light variable filter 61, light is able to reach the light reactive reflective paint of the symbol 34 and change its color. Contrast is enhanced by using nonreactive reflecting paint 32 in the same layer. The light sensitive symbol 34 displayed correlates with a wheel symbol 58 on the adjuster wheel 39 and to the number of clicks of the wheel needed to dispense the indicated amount of SPF.

Referring again to FIG. 1, as well as FIG. 7, a sliding graded multilayered UV light sensitive strip cover 62 is used to block light from activating the light reactive reflective paint of the symbol 34 so that the light reactive reflective paint is kept safe from damages due to prolonged exposure, thereby increasing shelf life. If desired, the user can self-test the UV protection cream being dispensed by applying a small amount directly to the graded multilayered UV light sensitive strip 31. This tells the user whether the sunscreen being dispensed is sufficient protection, based on chosen criteria such as day, time, skin color and location, for example.

Figure 8:
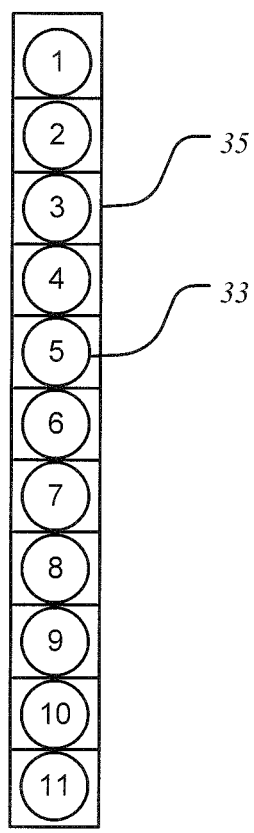
FIG. 8 is a front view of a multilayer skin color match sticker system 35 used in the preferred embodiment of the present invention.
Figure 9:
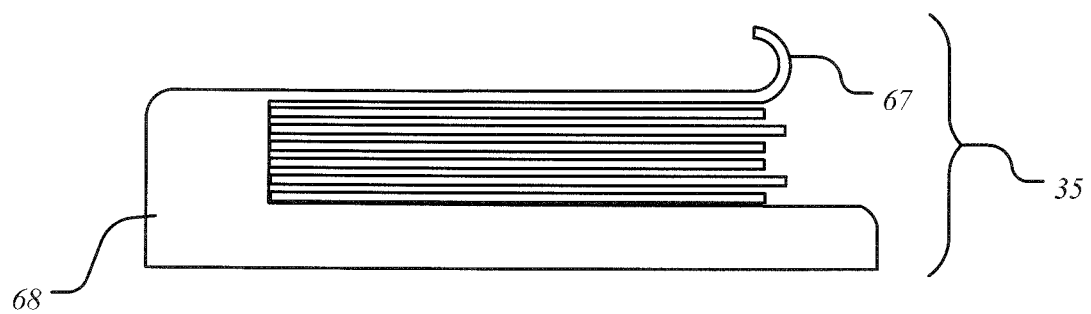
FIG. 9 is a cross-section of the multilayer skin color match sticker system 35 of FIG. 8 showing the individual layers.

As shown in FIGS. 1, 8 and 9, a multilayer skin color match sticker system 35 is located directly adjacent to the graded multi layered UV light sensitive strip 31. Layers may be removed to allow a user to match their own skin color with the color on the strip. Each skin color stickie 67 becomes progressively darker. Each skin color stickie 67 has numbers 33 along their length. The pack of stickies 35 are attached to the container 19 by an adhesive structure 68. A user locates where the graded multilayered UV light sensitive strip 31 changes color causing the respective light sensitive symbol 34 to become visible. The user matches that light sensitive symbol 34 to the number "2" for example, located adjacent to this region on the skin color stickies 35. This number on the skin color stickies will correspond to the number of clicks of the clicking adjuster wheel 39 (FIG. 1) necessary for the container 19 to dispense the correct proportion of UV protective cream based emollient or spray for that specific user's skin color.

Figure 2:
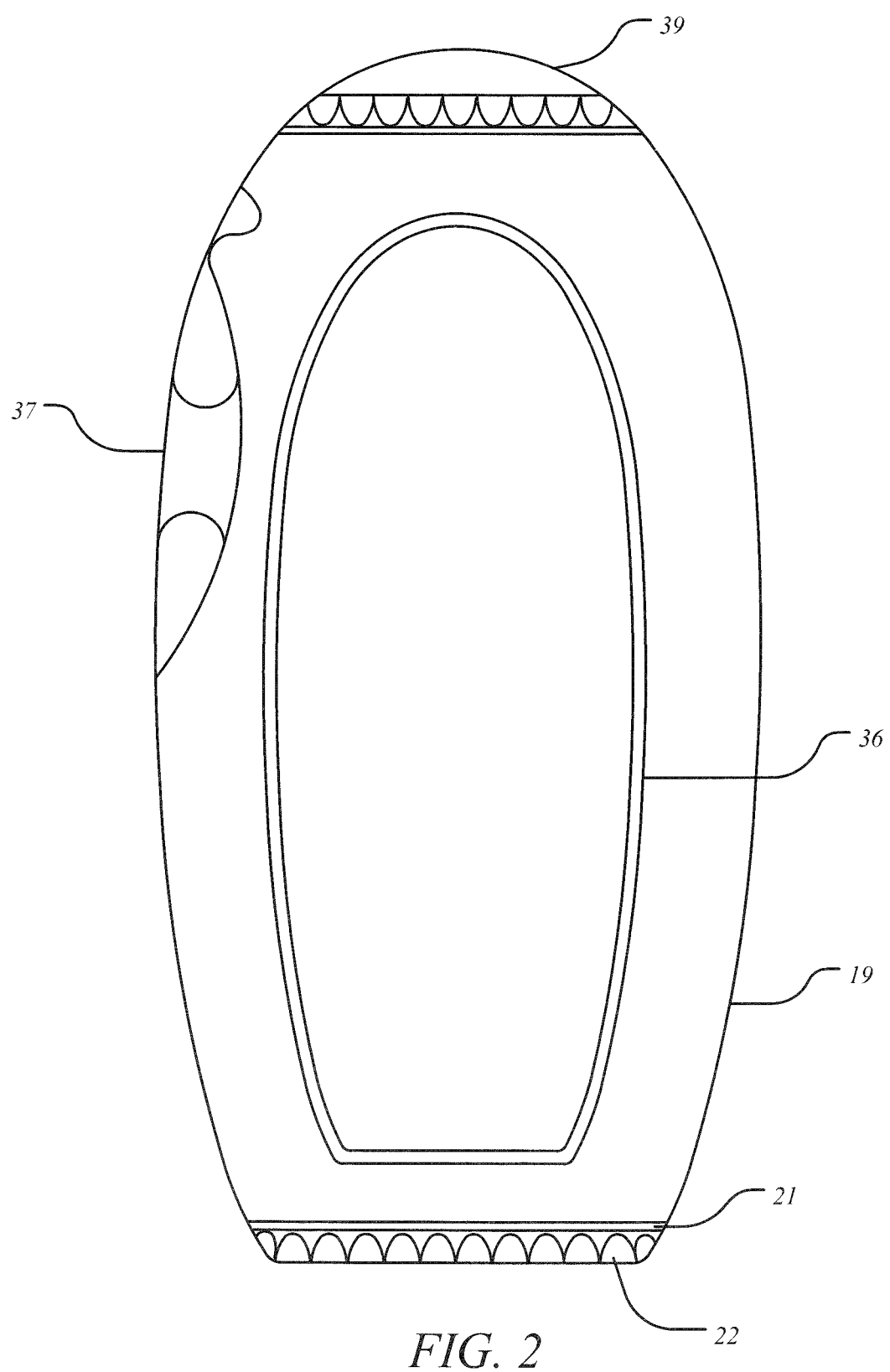
FIG. 2 is a rear view of the outside portion of the container 19 of FIG. 1 illustrating a replaceable friction plate 21 that fits in a surrounding silicone ring 22.
Figure 10:
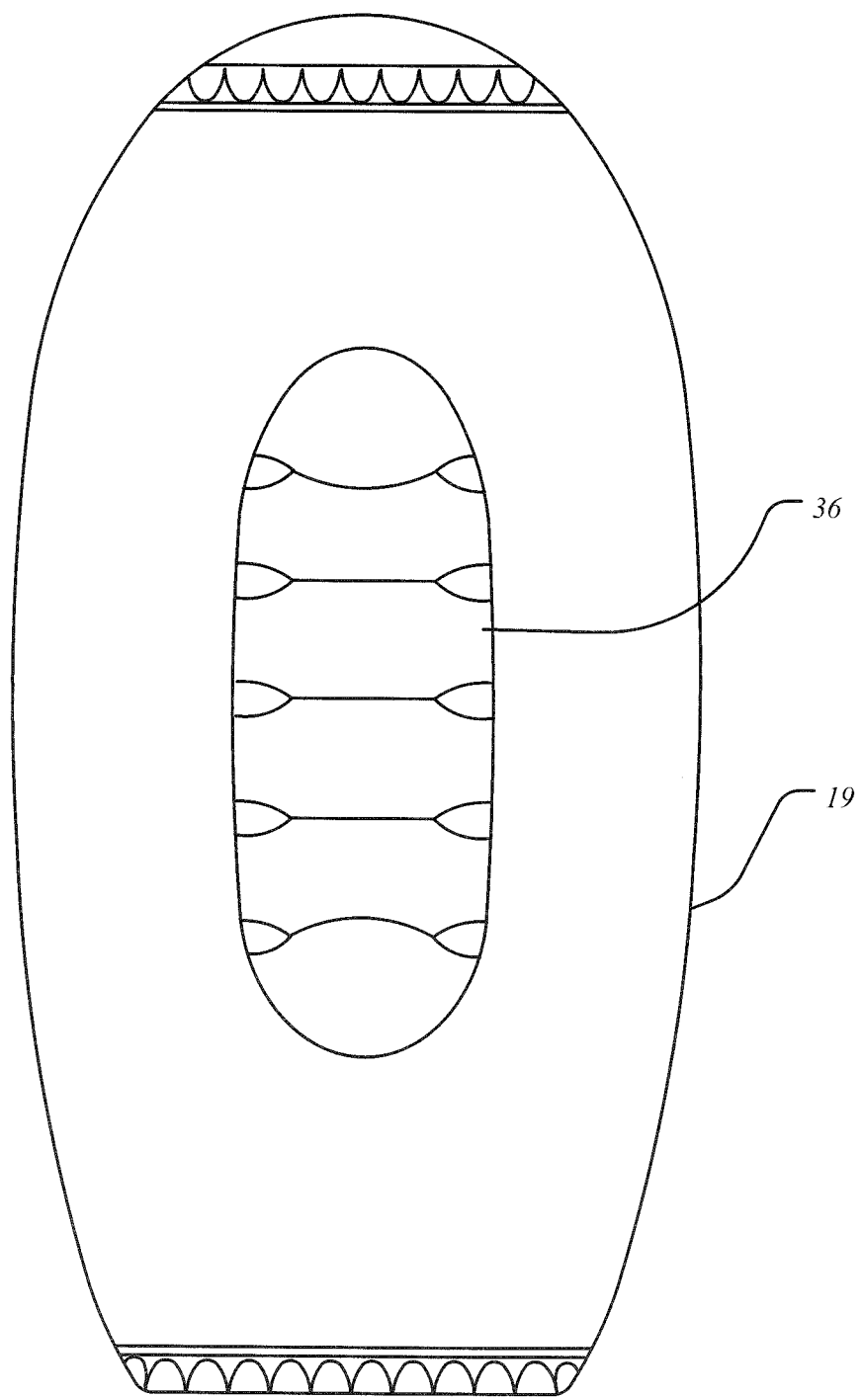
FIG. 10 is a left side view of the container 19 of FIG. 1, showing a replaceable silicone hand grip pad 36.
Figure 11:
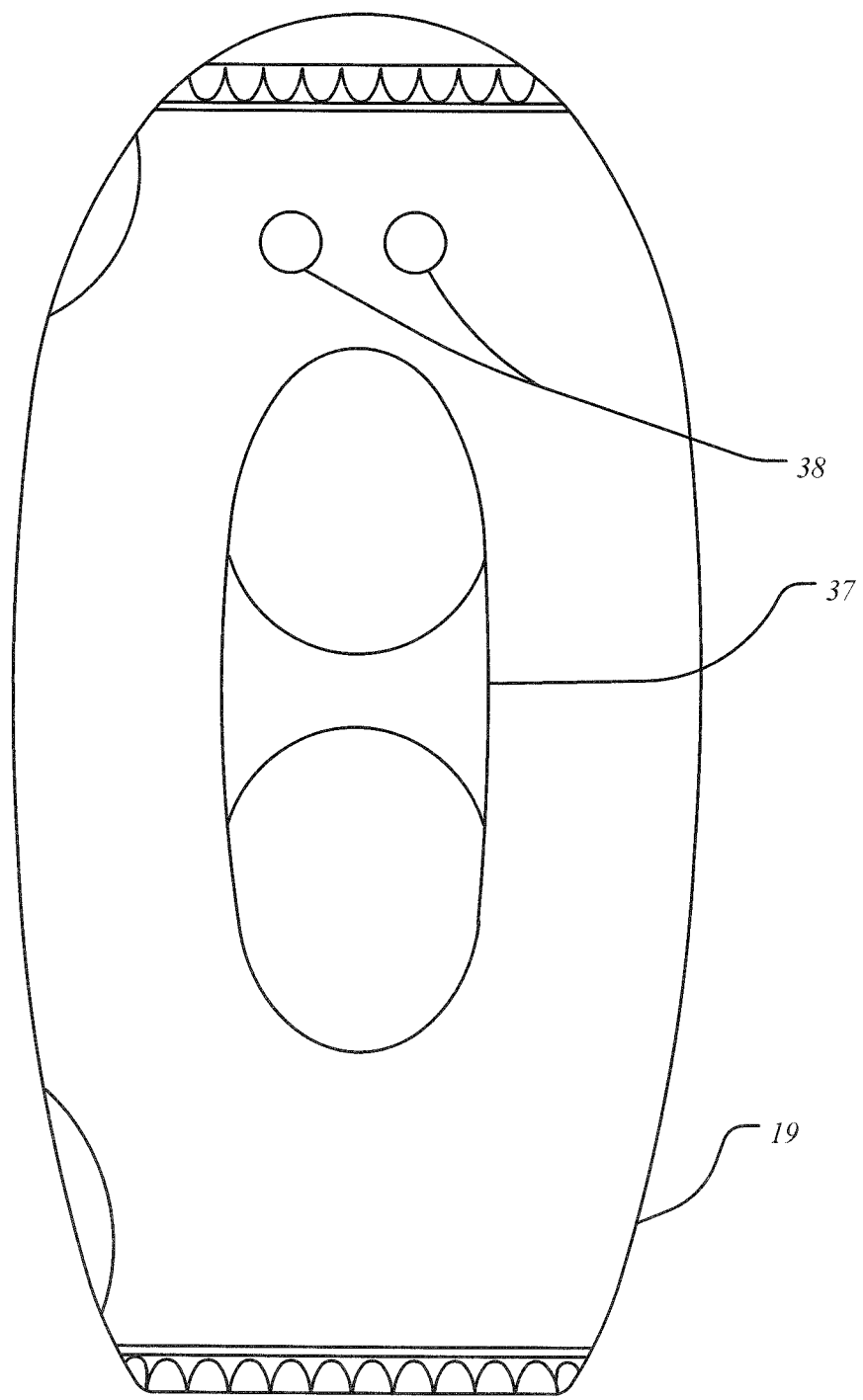
FIG. 11 is a right side view of the container of FIG. 1 showing a push button 37 and the self-retractable pressure nozzles 38.

The container is ergonomic as more readily seen from the rear (FIG. 2). It includes a replaceable hand grip 36. A frictionless ring 21 interfaces a removable base 22 that allows the internal cartridge 30 to be replaced. The replaceable silicone hand grip 36 (FIG. 10) gives the user a steady grip on the container when discharging its contents.

Figure 12:
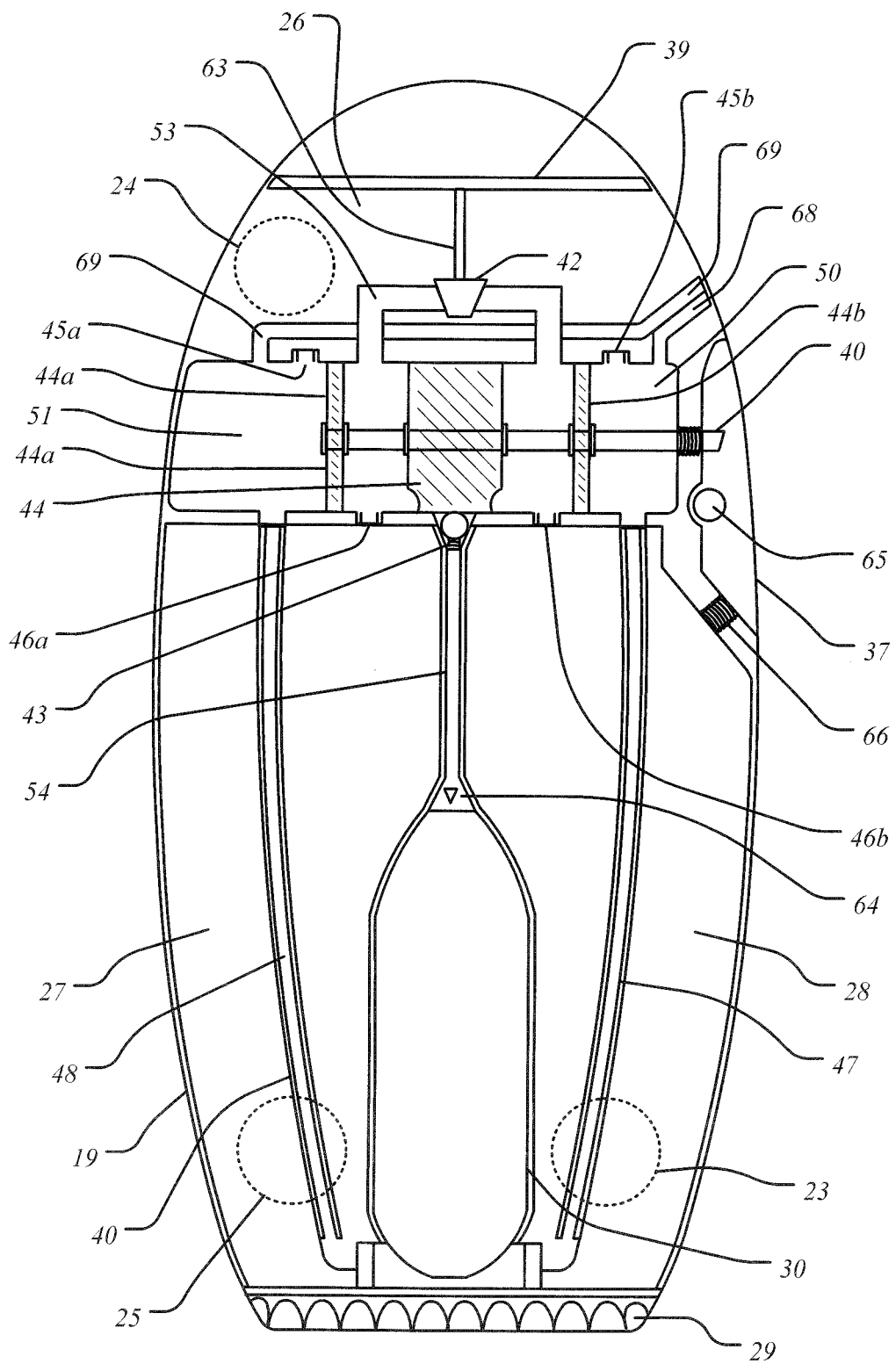
FIG. 12 is a cross section of the container 19 of FIG. 1 showing the relative distribution and spacial relation between the major internal components of the container.
Figure 13:
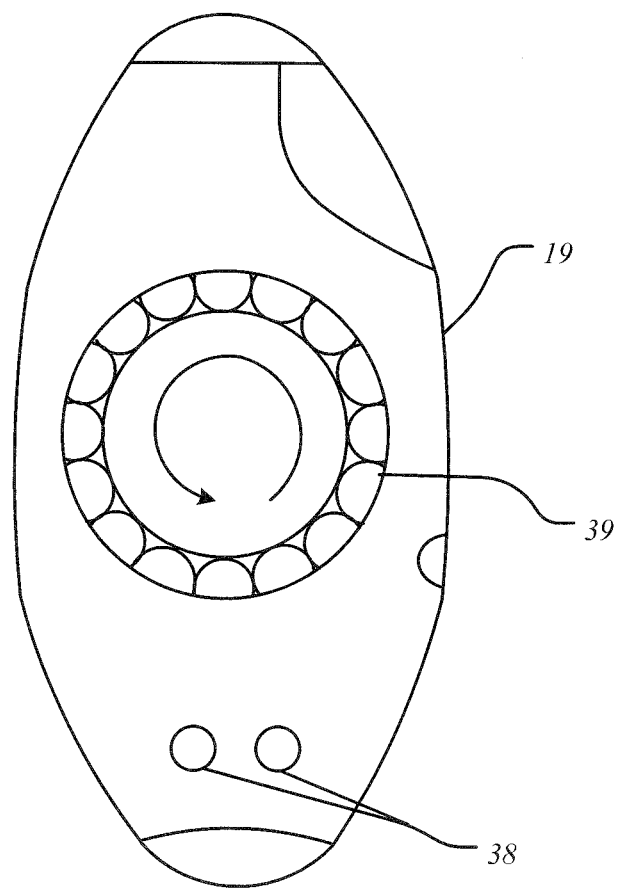
FIG. 13 is a top view of the container 19 of FIG. 1 showing self-retractable pressure nozzles 38 in the closed position and an adjustment wheel used to regulate the outflow of substance from an internal compartment.
Figure 14:
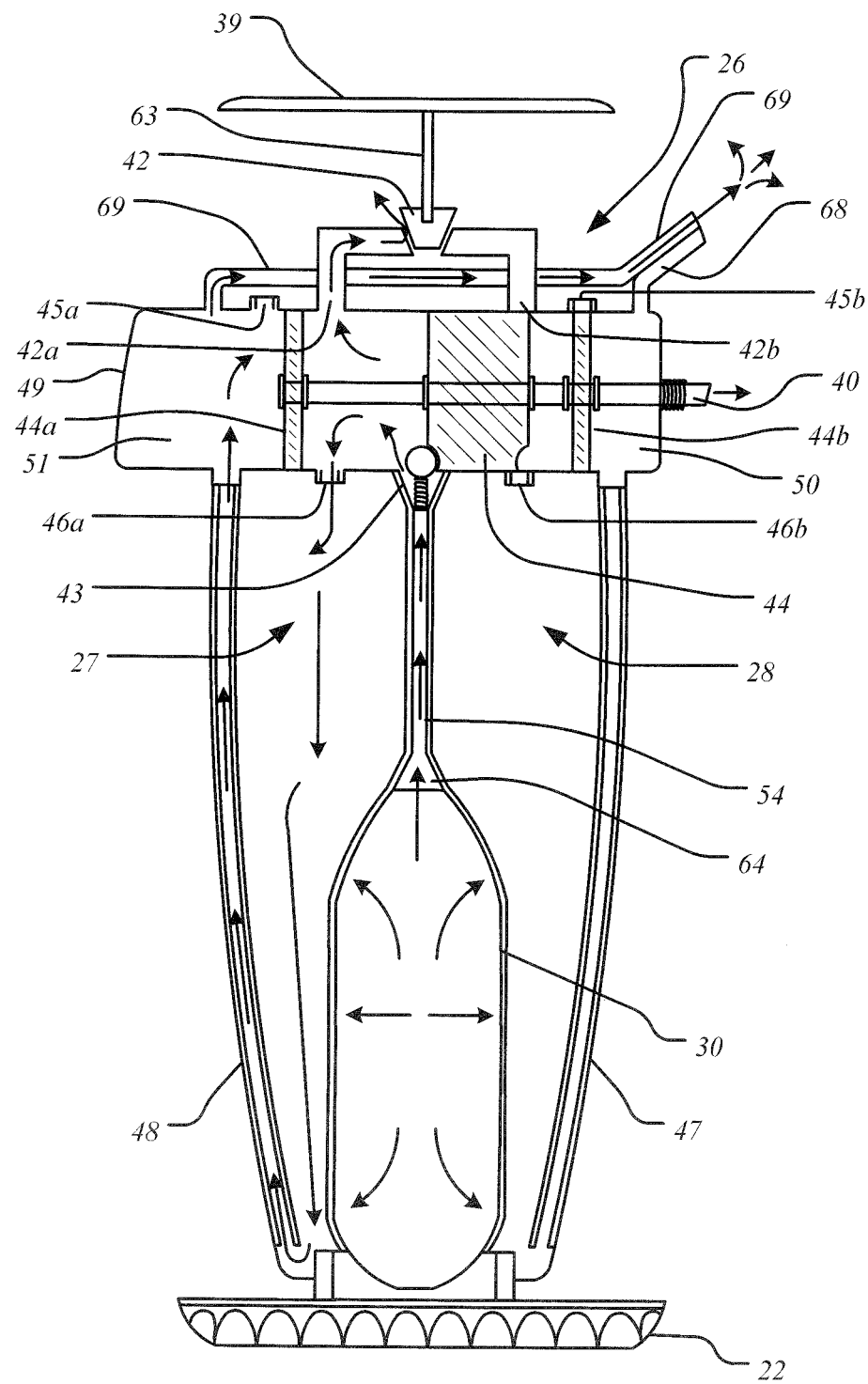
FIG. 14 is a partial cross-section of the internal components of the container of FIG. 1 during depression of the lower part of the push button 37 demonstrating propellant, substance, and mixture directed movement throughout the components based on the resulting position of the main shaft 40.

FIG. 12 shows the internal components of the container 19 and their spacial relationship to each other. The clicking adjuster wheel 39 at the top of the container 19 is fastened to an adjuster shaft 63 that is threaded to a conically-shaped flow-regulating valve 42. The top of the container and the adjuster wheel 39 is shown in FIG. 13. FIG. 14 shows a cross-sectional view of the placement of the internal components in container 19. The function of the adjuster wheel 39 will be discussed more fully hereinafter.

Referring again to FIG. 12, a pressure cartridge 30 inserted from the bottom of container 19 fits between internal compartment two 27 and internal compartment three 28. The pressure cartridge 30 is held in place at the bottom of the container by a threaded wheel base 29, and at the top by a threaded receiving end 64. This is more clearly seen in FIG. 14. As the pressure cartridge 30 is threaded into the threaded receiving end 64, it is locked into the high pressure propellant pipe 54.

When the push button 37 on the side of the container is in neutral position, propellant is only present in the high pressure propellant pipe 54. Propellant flow is restricted by a ball bearing one way pressure valve 43. A rubberized piston 44 and associated pistons 44a on the left and 44b on the right, pushes the ball bearing one way pressure valve 43 down into a closed position, simultaneously blocking the orifice leading to the high pressure propellant pipe 54, preventing propellant flow. Pushing on the push button 37 moves the rubberized piston 44 allowing the propellant to flow.

Referring to FIG. 12, the push button 37 that is located on the side of the container 19 controls the flow of the mixture to be dispensed, and whether the substance in internal compartment one 26 is to be mixed with that from internal compartment two 27 or internal compartment three 28. An axle 65 goes through the push button 37 allowing it to rock around the axle. A main shaft 40 connects the top of the push button 37 to the rubberized piston 44 and associated pistons 44a and 44b. When the top of the push button 37 is depressed, the main shaft 40 and the rubberized piston 44 and associated pistons 44a and 44b are pushed to the left. If the bottom part of the push button 37 is depressed, the rubberized piston 44 and associated pistons 44a and 44b are pulled to the right. This push/pull action determines the direction and amount of propellant flow through the lower one way check valve 46a or lower one way check valve 46b. The propellant will enter either internal compartment two 27 through one way check valve 46a or internal compartment three 28 through internal check valve 46b. This pushes the substances in the containers into their respective intake pipes, right hand intake pipe 47 or left hand intake pipe 48. The push button 37 returns to the neutral position upon release, as a result of the action of spring 66. Details of this system are more clearly shown in FIGS. 15A-15D and will be more fully discussed hereinafter.

Figure 16A:
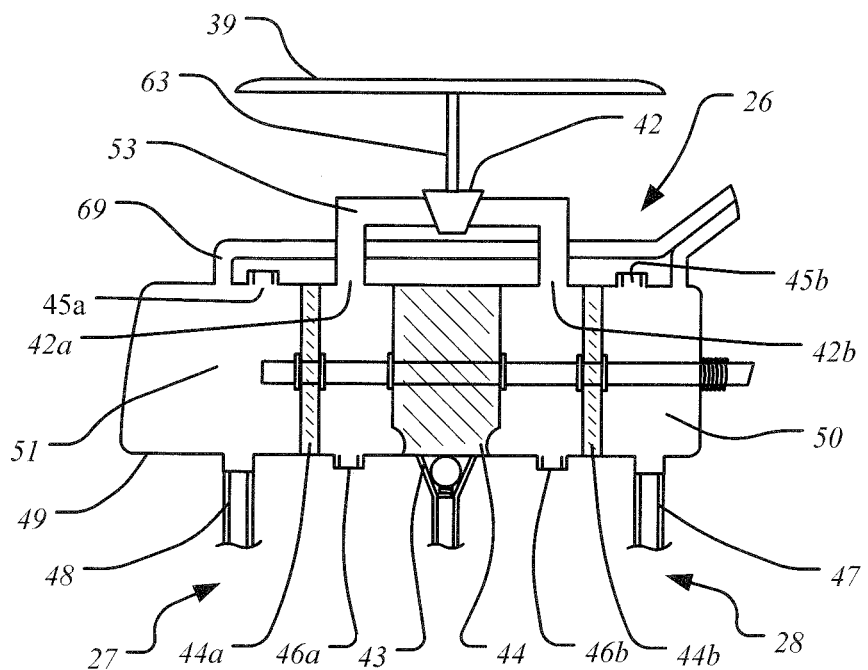
FIGS. 16A and 16B show the adjusting valve system.
Figure 16B:
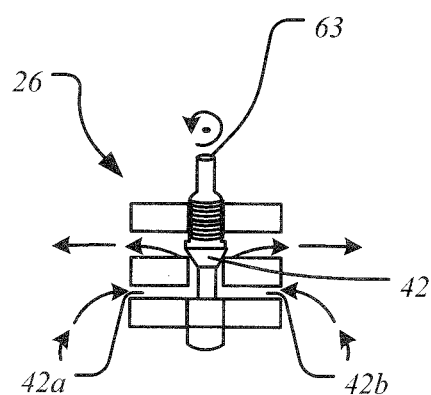

A rubberized piston 44 and associated pistons 44a and 44b, as shown in FIG. 14 and in more detail in FIG. 16A is an important element of the container 19. The rubberized piston 44, 44a, 44b is housed within the piston cylinder 49 containing multiple apertures. A threaded conically-shaped flow-regulating valve 42 at the top of the cylinder 49 and two one way check valves 46a, 46b at the bottom, control the flow. The upper aperture threaded conically-shaped flow-regulating valve 42 allows propellant to enter internal compartment one 26, as shown in FIGS. 14 and 16B. The lower left one way check valve 46a allows gas to enter internal compartment two 27. The lower right one way check valve 46b allows gas to enter internal compartment three 28. As explained above, the ball bearing one way pressure valve 43 is between the lower one way check valves 46a, 46b. While the push button 37 is in a neutral position, the ball bearing one way pressure valve 43 blocks the flow of propellant because it is depressed by the rubberized piston 44.

Figure 15A:
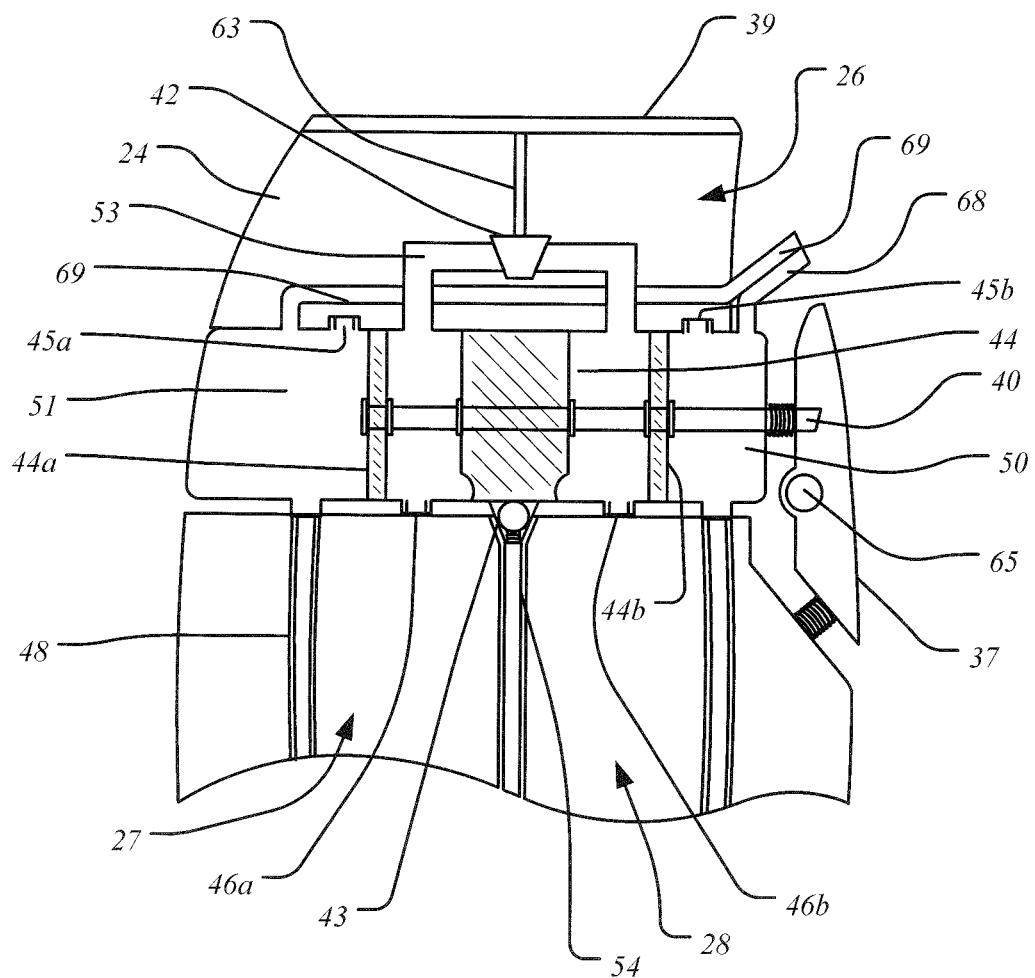
FIGS. 15A, 15B, 15C, and 15D illustrate the function of the push button 37, self-retractable pressure nozzles 38, and rubberized piston 44 in the container of FIG. 1.
Figure 15B:
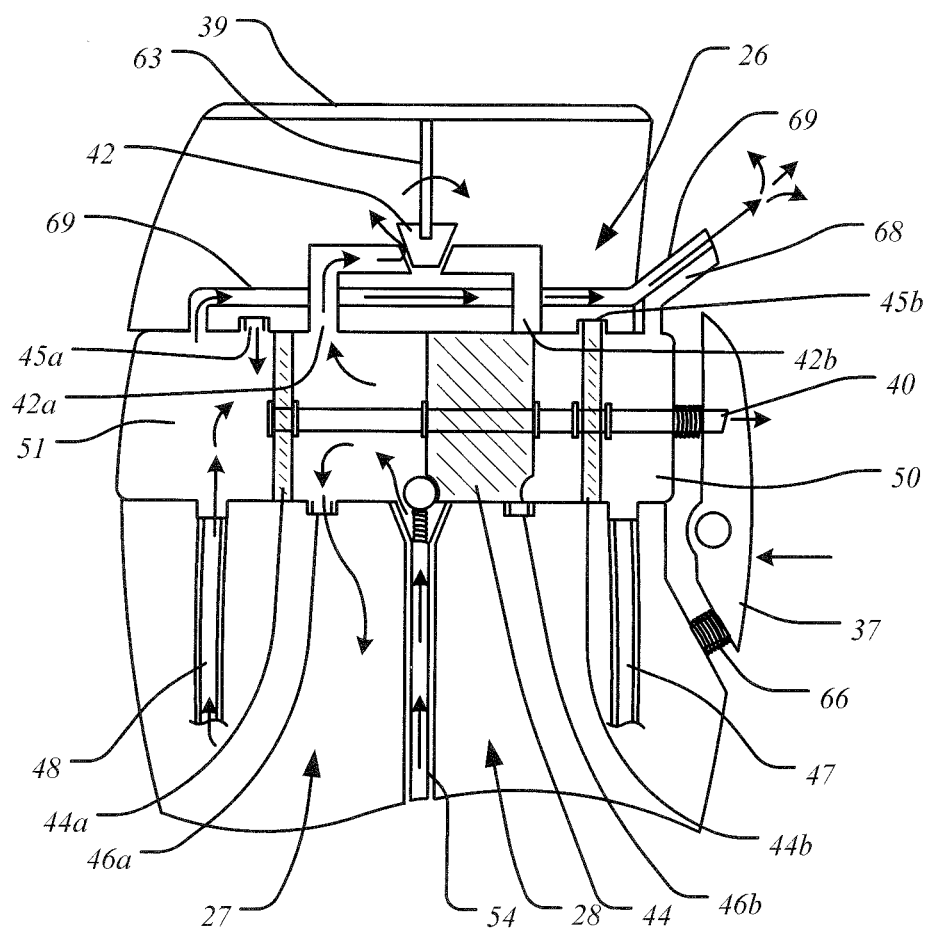

If a user wants to dispense a mixture from internal compartments one 26 and internal compartments two 27, the bottom part of the push button 37 is depressed as shown in FIG. 15B so the main shaft 40 is pulled, moving the rubberized piston 44 and associated pistons 44a and 44b to the right. Movement of piston 44 opens the left-hand side valves, including the threaded conically-shaped flow-regulating valve 42 and the lower one way check valve 46a. The propellant is allowed to flow, as shown in FIG. 14. The propellant travels down into internal compartment two 27, displacing its contents into the left hand mixing compartment 51. At the same time, the propellant also moves through the threaded conically-shaped flow-regulating valve 42 and displaces substance from internal compartment one 26 through one way check valve 45a into mixing compartment 51. The displaced substance from internal compartment one 26 correlates to the amount of propellant allowed to enter internal compartment one 26 by the threaded conically-shaped flow-regulating valve 42. As shown in FIG. 14, a specified amount of substance from compartment one 26 is moved into the left hand mixing compartment 51 through one way valve 45a. The resultant mixture moves to the mixing pipe 69 that has a spiral insert 41 to help further mix the substances before they are extruded via the self-retractable pressure nozzles 38 (FIG. 15D).

Figure 15C:
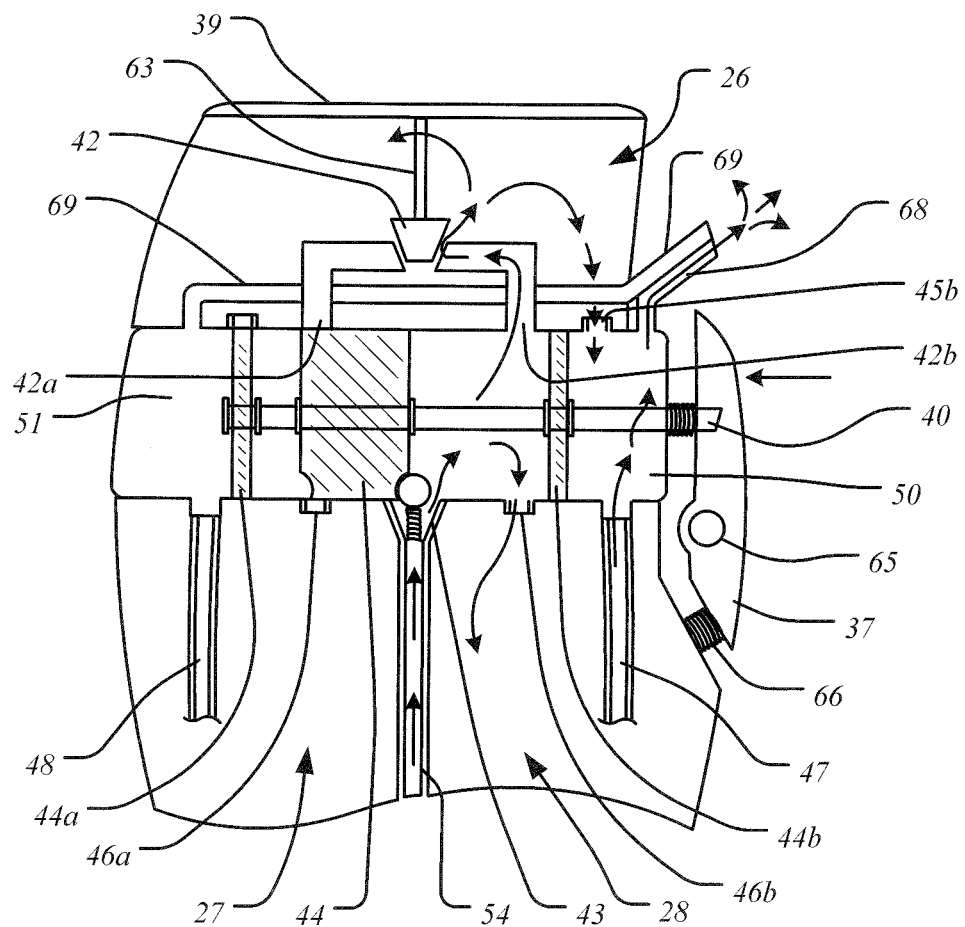

If a user wants to dispense a mixture from internal compartment one 26 and internal compartment three 28, the top part of the push button 37 is depressed so the main shaft 40 is pushed, moving the rubberized piston 44, 44a and 44b to the left as shown in FIG. 15C, opening the right-hand side valves, including the threaded conically-shaped flow-regulating valve 42 and the lower one way check valve 46b, so that propellant is allowed to flow. The propellant travels down into internal compartment three 28, displacing its contents into the right hand mixing compartment 50. Simultaneously, propellant travels upwards through the threaded conically-shaped flow-regulating valve 42 and enters internal compartment one 26 at the flow rate fixed by the valve 42. This continuously displaces a fixed amount of substance, such as a UV-protective agent into the mixing chamber 50 through one way check valve 45b, as long as the top of button 37 is pushed.

A detailed illustration of the structure of rubberized piston 44 and associated pistons 44a and 44b are shown in FIG. 16A. A detailed illustration of the threaded conically-shaped flow-regulating valve 42 is shown in FIG. 16B.

Figure 15D:
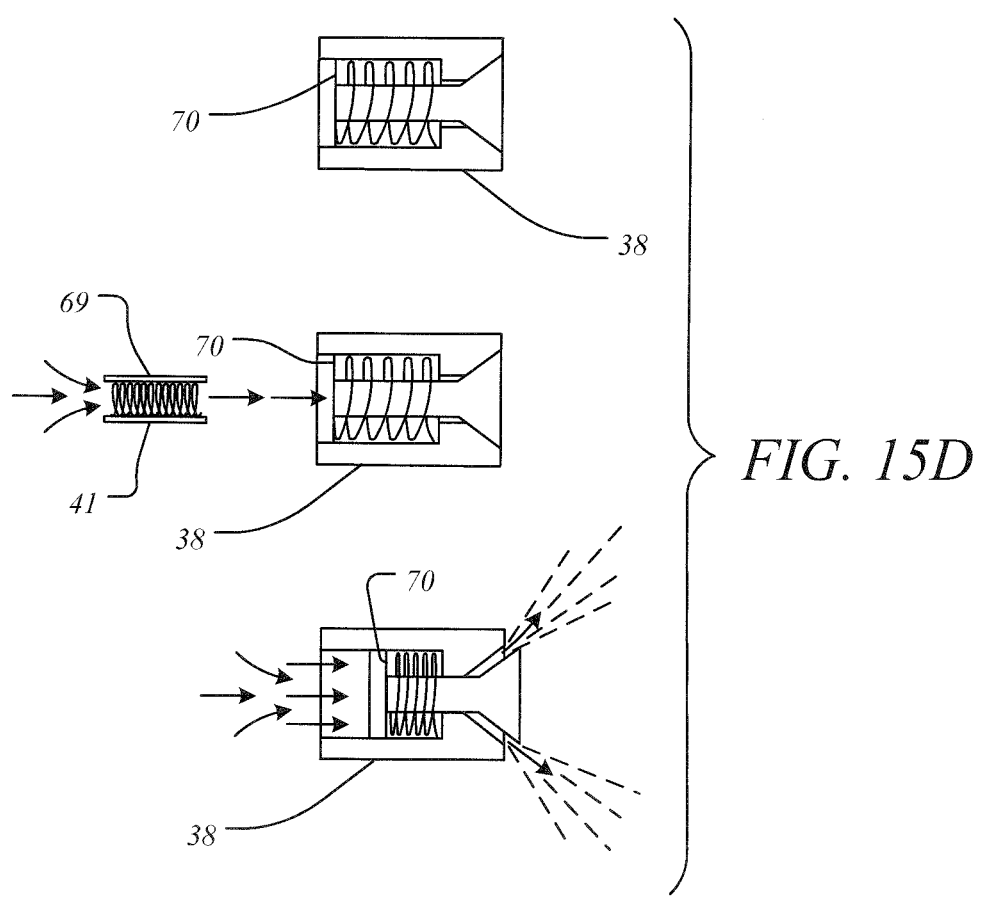
Figure 18:
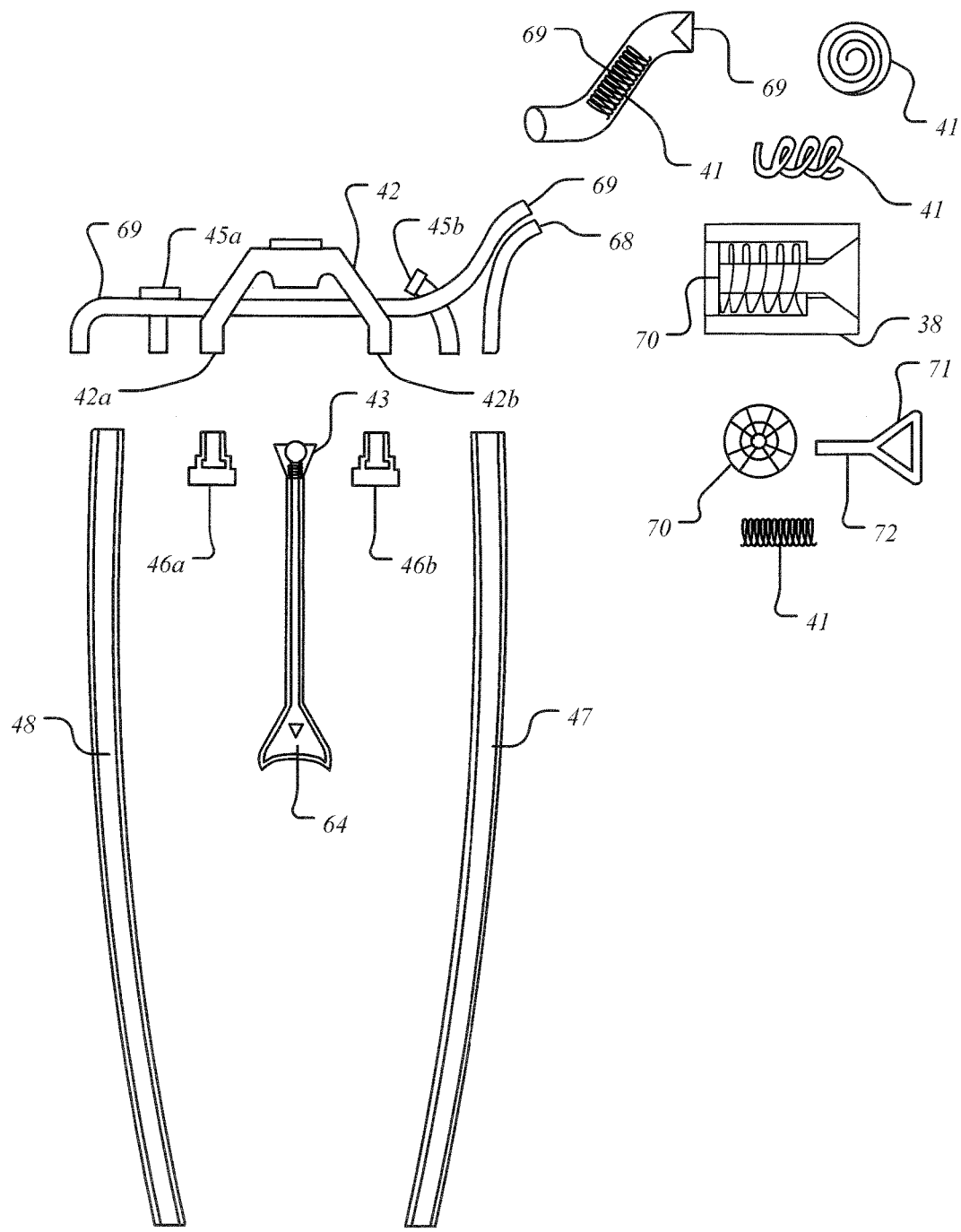
FIG. 18 is an exploded view of the main internal components that direct and channel pressurized propellant, individual substances, and the resulting mixture throughout the device, until extruded from the container.

After the mixture of the two substances moves through the mixing pipe, the mixture is ejected via one of two self-retracting pressure nozzles 38 located near the top of the container 19, as shown in FIG. 15D and FIG. 18. As the mixture enters the dispensing area, it moves through a spring-loaded aperture-containing plate 70. The mixture causes pressure to build up on the inside of a cone 71, which is attached to the spring-loaded aperture-containing plate 70 by an ejector shaft 72. This results in the cone 71 moving forward allowing the pressurized mixture to be expelled, until the pressure is equalized. When there is no pressure on the spring-loaded aperture-containing plate 70, the spring causes the cone 71 to go back to its initial position and the cone 71 seals off the opening. A detailed view of the various valves and components of the self-retracting pressure nozzle is shown in FIG. 18. Please note that there are seals (not shown) located between all moving components and pressurized areas to prevent leakage.

Figure 17:
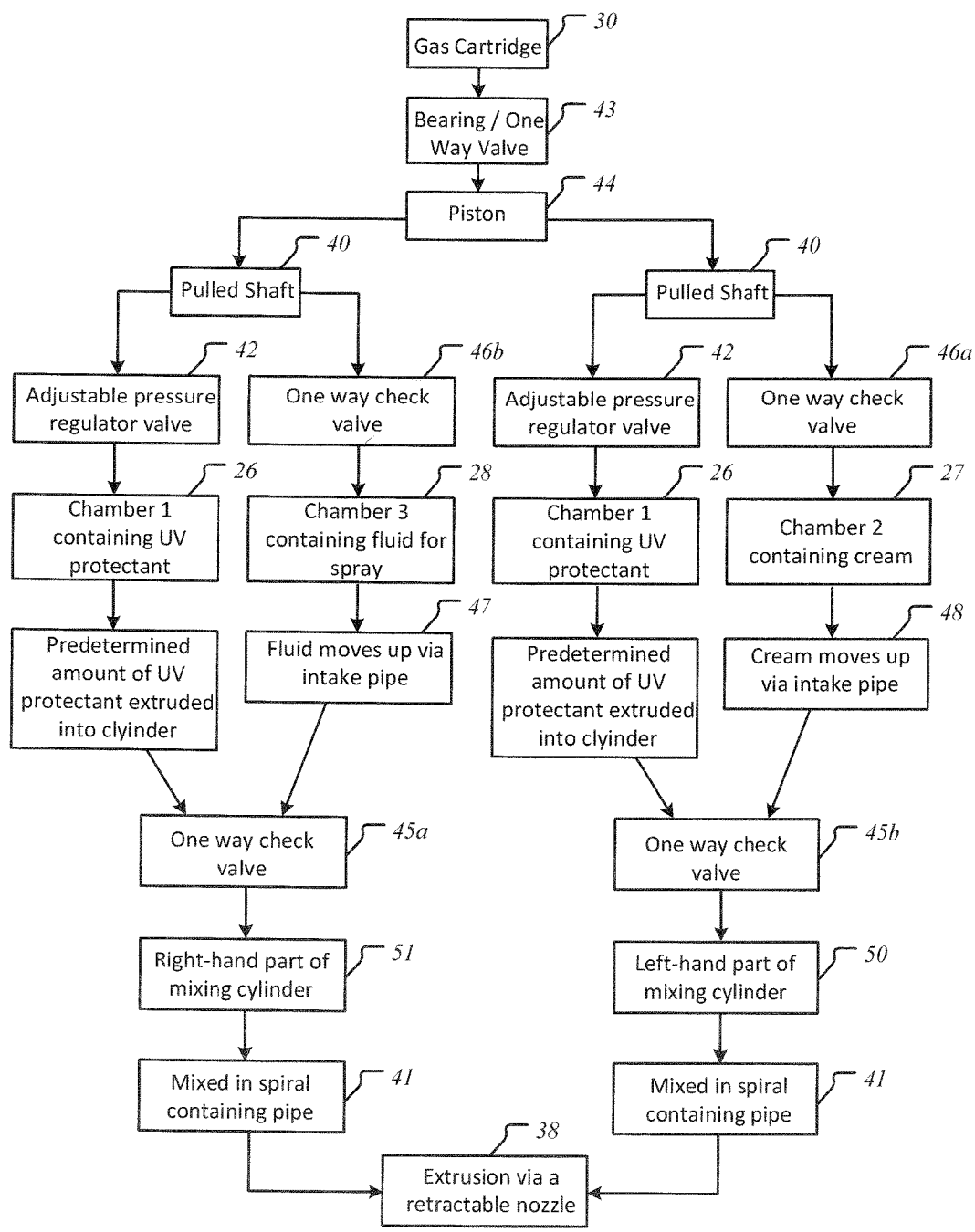
FIG. 17 is a block diagram representation of the propellant and substance flowing through major components of the container based on push button position.

FIG. 17 illustrates the various operations possible with the dispensing container of the present invention, as the result of the organization and structure of the key components.

A pressurized cartridge 30 dispenses propellant under control of a threaded conically-shaped flow-regulating valve 42. A rubberized piston 44 controls the path of travel of the propellant throughout the device.

The rubberized piston 44 and associated pistons 44a and 44b are controlled by moving it left or right by a main shaft 40. Pushing the main shaft 40 (FIG. 15C) causes the pressurized propellant to flow through the threaded conically-shaped flow-regulating valve 42 to internal compartment one 26 and through a one-way check valve 46b to internal compartments three 28. Internal compartment one 26 may contain a UV protectant. Internal compartment three 28 may contain a spray fluid for mixing with the UV protectant.

The UV protectant from internal compartments one 26 is moved out of the internal compartment in an amount determined by the user by adjusting the clicking adjuster wheel 39 (FIG. 14). The spray fluid from internal compartment three 28 is moved out of the internal compartment through the right hand intake pipe 47 into a right hand mixing compartment 50. The mixture moves out of the right hand mixing compartment 50 through a mixing pipe 68 to a self-retractable pressure nozzle 38, where it is expelled in a UV spray.

If the main shaft 40 connected to the rubberized piston 44, 44a, 44b is pulled (FIG. 15B), the rubberized piston 44, 44a, 44b moves to the right. This causes pressurized propellant to flow through the threaded conically-shaped flow-regulating valve 42 to internal compartment one 26 and through the lower one way check valve 46a to internal compartment two 27. Internal compartments one 26 may contain the UV protectant. Internal compartment two 27 may contain a cream based emollient for mixing with the UV protectant.

The UV protectant from internal compartment one 26 is moved out of the internal compartment in a predetermined amount, as determined by the user, by adjusting the clicking adjuster wheel 39 (FIG. 19). The cream based emollient from internal compartment two 27 is moved out of the internal compartment, through the upper one-way check valve 45a, into a left hand mixing compartment 51. The mixture moves out of the left hand mixing compartment 51 through a mixing pipe 69 to a self-retractable, pressure nozzle (FIG. 15D) 38 where it is expelled as a UV cream.

The foregoing description of a preferred embodiment of the invention was presented for illustration and description. It was not intended to limit the invention to the precise form disclosed. Those skilled in the art will understand how to best utilize the invention in various embodiments and various modifications as are best suited to the use contemplated. The scope of the invention should not be limited by the specification, but defined by the following claims.

What is claimed is:

1. A handheld apparatus for holding separate fluids and mixing the fluids prior to dispensing the mixture, comprising:
    a container;
    a first compartment, and a plurality of additional separate compartments located in the container;
    a mixture ejector nozzle located in the container;
    a canister containing pressurized gas located in the container;
    a mixing chamber located in the container connected to the first compartment, the plurality of additional separate compartments, the mixture ejection nozzle and the canister of pressurized gas;
    a piston valve located in the mixing chamber movable to connect the canister of pressurized gas to the mixing chamber and one of the additional plurality of compartments;
    a flow regulating valve connected to the mixing chamber and the first compartment for regulating pressurized gas flow into the first compartment and flow from the first compartment into the mixing chamber; and
    a push button actuator on the outside of the container connected to the piston valve for moving the piston valve to the right or to the left.

2. The apparatus of claim 1 further comprising a selector on the outside of the container connected to the flow regulating valve for controlling the amount of pressurized gas allowed to flow into the first compartment.

3. The apparatus of claim 2 wherein the piston valve in the mixing chamber is movable to select one of the plurality of additional separate compartments in the container.

4. The apparatus of claim 3 wherein the push button actuator is connected to the piston valve to cause the piston valve to select one of the plurality of additional separate compartments in the container for mixing with fluid in the first compartment.

5. The apparatus of claim 1 wherein the push button actuator is a toggle lever.

6. The apparatus of claim 1 wherein the mixture ejector nozzle is located in the container and moves to an open position, extending beyond the outside of the container when ejecting a mixture.

7. The apparatus of claim 6 wherein the mixture ejector nozzle is spring-loaded to retract into the container when the container is not ejecting a mixture.

8. The apparatus of claim 2 wherein the selector on the outside of the container selects between a plurality of settings, each setting allowing a different amount of gas flow.

9. The apparatus of claim 1 wherein the first compartment and the plurality of additional compartments are refillable and the pressurized gas canister is replaceable.

10. The apparatus of claim 1 further comprising
    a temperature sensitive material located on the outside of the container to indicate when the container has been exposed to excessive heat.

11. The apparatus of claim 10 further comprising a UV graded detector strip for detecting the level of UV in the environment of the container, the strip indicating a certain SPF number that corresponds with the amount of UV light being detected.

12. The apparatus of claim 11 further comprising a skin color strip having skin color spots thereon that are numbered according to the darkness of human skin for allowing a user to determine a number that matches.

13. The apparatus of claim 12 wherein the UV detection and SPF number indicator strip are arranged in proximity on the container to allow a user to determine the appropriate SPF number for a selected skin color.

14. The apparatus of claim 8 wherein the selector on the outside of the container has a plurality of SPF settings.

15. The apparatus of claim 14 further comprising a UV detector strip for detecting the level of UV in the environment of the container, the strip indicating a certain SPF number that corresponds with the amount of UV light being detected.

16. The apparatus of claim 15 further comprising a skin color strip having skin color spots thereon that are numbered according to the darkness of human skin for allowing a user to determine a number that matches.

17. The apparatus of claim 16 wherein the UV detection and SPF number indicator strip are arranged in proximity on the container to allow a user to determine the appropriate SPF number for a selected skin color.

* * * * *